Sept. 25, 1923.
E. F. KINGSBURY
FILM CARTRIDGE
Filed Jan. 21, 1921
1,469,017
3 Sheets-Sheet 1
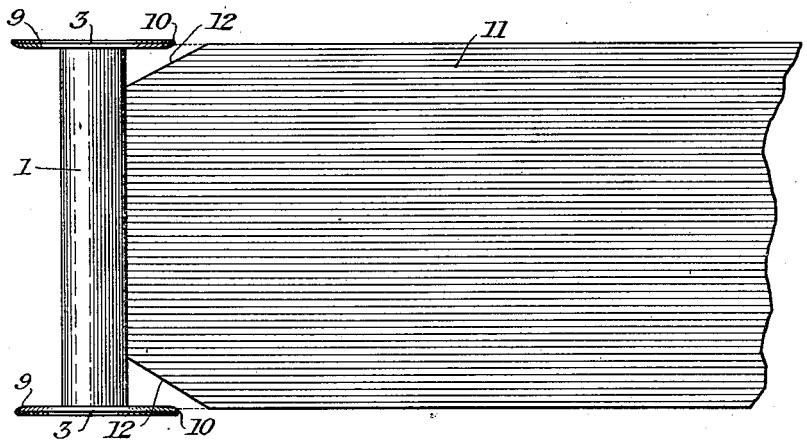
FIG - 1.
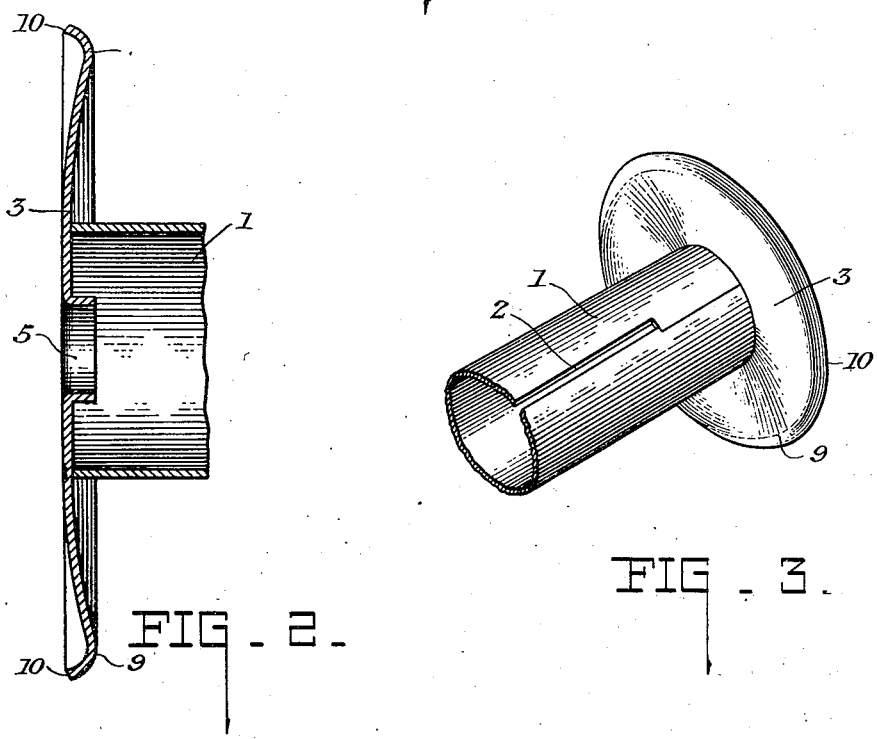
FIG - 2.
FIG - 3.
WITNESSES:
INVENTOR
Edwin F. Kingsbury,
BY
ATTORNEYS.

Sept. 25, 1923.                E. F. KINGSBURY                1,469,017
                                 FILM CARTRIDGE
                         Filed Jan. 21, 1921      3 Sheets-Sheet 2

WITNESSES:
Donald H. Stewart

INVENTOR
Edwin F. Kingsbury,
BY R. L. Stinchfield
N. M. Perris
        ATTORNEYS.

Sept. 25, 1923.
E. F. KINGSBURY
FILM CARTRIDGE
Filed Jan. 21, 1921
1,469,017
3 Sheets-Sheet 3
FIG_9_
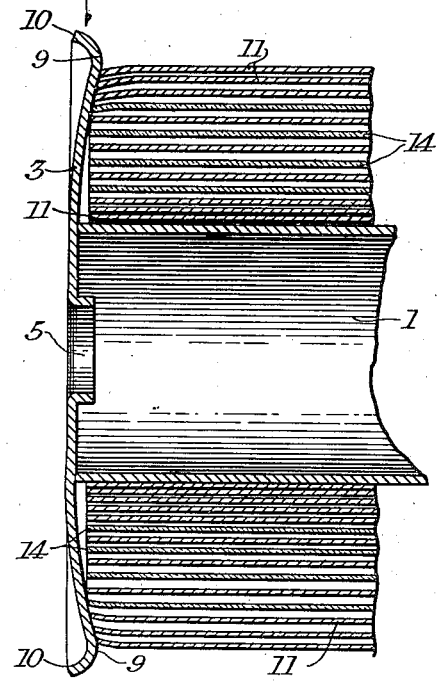
FIG_10_
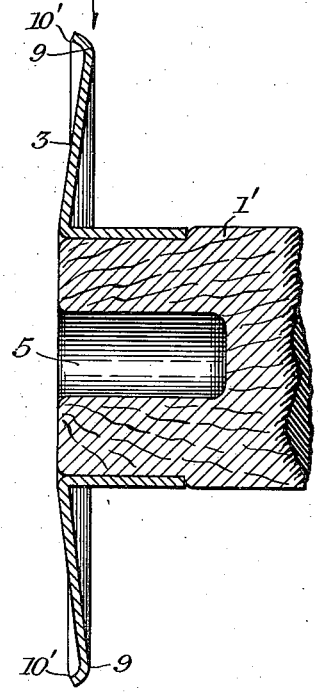
FIG_11_
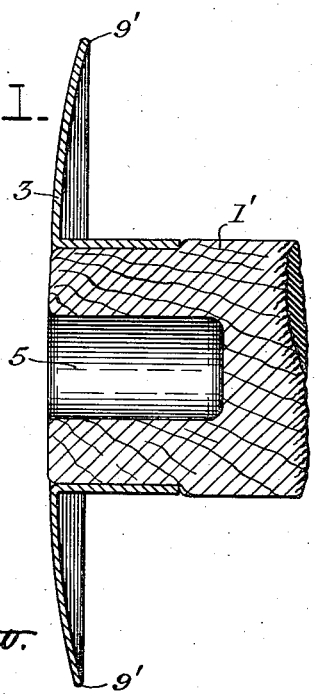
FIG_12_
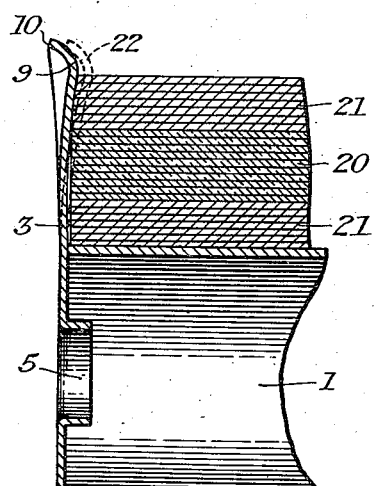
WITNESSES:
INVENTOR
Edwin F. Kingsbury,
BY
ATTORNEYS.

Patented Sept. 25, 1923.

1,469,017

UNITED STATES PATENT OFFICE.

EDWIN F. KINGSBURY, OF RUTHERFORD, NEW JERSEY, ASSIGNOR TO EASTMAN KODAK COMPANY, OF ROCHESTER, NEW YORK, A CORPORATION OF NEW YORK.

FILM CARTRIDGE.

Application filed January 21, 1921. Serial No. 438,888.

*To all whom it may concern:*

Be it known that I, EDWIN F. KINGSBURY, a citizen of the United States of America, residing at Rutherford, in the county of Bergen and State of New Jersey, have invented certain new and useful Improvements in Film Cartridges, of which the following is a full, clear, and exact specification.

This invention relates to a film cartridge of a type commonly used in cameras, and comprising a roll of film and protective paper carried upon a spool.

While the use of roll film by amateur photographers is exceedingly extensive and is, on the whole, very reliable, there is an objectionable feature and cause of annoyance, that has not hitherto been fully overcome. The camera and film are so designed and proportioned that a strip of film of somewhat greater width than the exposure area of the camera, passes the field of exposure, and there should remain a clear space along each edge of the film when developed. It sometimes happens, however, that light enters the roll of film and impresses the marginal portions thereof to a greater or less degree, and this in extreme cases, may penetrate beyond the portion allowed as a margin and encroach upon the picture area. It results in what is known as "edge fog" in the developed film. This edge fog is particularly objectionable when it is desired to use the margin of the film for light printing inscriptions thereon, as in a certain form of camera such as that described in the patent to Leschbrandt, No. 1,284,379, granted November 12th, 1918. It is obvious that in order for the light printed legend to be clearly legible upon the border of the film, the latter must be free from fog.

I have investigated extensively the causes and methods of overcoming this objection; and the main object of my invention is to provide a structure that will obviate this fault, without introducing other objectionable features. The type of film cartridge discussed is that consisting of a central core with end flanges, upon which is wound the film with its protective paper. This may be a long strip of backing paper, to which is attached at the leading end a length of film sufficient for several exposures in an appropriate camera, the paper extending beyond it at each end to constitute a safety leader, the outer end of which is held down by a paper sticker or seal. The strip of film may have a lead strip of protective paper attached to each end of it, and no backing paper. Numerous tests with such a cartridge prove that excessive edge fog may be caused in several ways, the principal of which are the following:

1. The paper has a tendency to unroll and the user is often careless, and lays down a roll after the seal is broken and before use, or after use and before resealing, or he allows too much slack in the camera while inserting or removing the spool, permitting the paper on the spool to expand. Such loosening of the paper, of course, tends to permit light to enter between the convolutions and fog the sensitive film.

2. The paper may be slightly narrower than the distance between the flanges. It is obvious that however accurate manufacture may be, there must be certain tolerances, and if the paper happens to be of the minimum tolerated width and the spool of the maximum tolerated dimensions, and if further the paper tends to wind along one flange of the spool, there will result, in spite of ordinary manufacturing precautions, a narrow space between the roll of paper and the other flange of the spool, and if the roll is exposed to the open light, rays will penetrate into this space and tend to fog one edge of the film. Moreover, the dimensions of the core of the spool, if of wood, and particularly of the paper, are subject to very appreciable changes due to variation in atmospheric conditions, especially humidity. Paper that is quite dry may in moist air in a short time expand in width by 1 to 1½ per cent. In winding dry paper there must, therefore, be left a certain clearance to permit of expansion, or if the spool is used in moist weather the paper may bind and run irregularly and eccentrically in the camera. If the paper is wound in moist atmospheric conditions, it may shrink in dry weather and leave an undesirable large clearance at one end.

From the above discussion it follows that in order to overcome the principal causes of edge fog, it is necessary to prevent the accidental unwinding of the protective paper both during insertion into and removal from the camera and also if laid down in an unsealed condition; and it is also necessary that means shall be provided to prevent the entrance of light between an end flange and the edge of the paper, while allowing for expansion of the paper due to changes in atmospheric conditions, and without binding the edge of the paper so tightly that it will be cramped or that it will slow down or affect objectionably the operations of rolling the paper and film on or off the spool. Furthermore it is desirable that the cost of manufacture of the spool shall not be materially increased and that no change in the spool shall be made which will unfit it for use in existing cameras.

The structure which I find best attains these and other objects is a spool of the general type discussed, but the end flanges of which are so shaped as to hold the paper rolled at all times, while permitting its ready removal or insertion by ordinary rolling operations. This is done by giving the flange a slight inward inclination from the central portion, this inclination extending to a point nearly at the periphery of the flange. This gradual inclination, as distinguished from an abrupt shoulder, tends to hold particularly the outer convolutions, whatever the size of the roll, and to hold all the convolutions in place; and it holds a partially unwound roll or a roll of small diameter as well as a full or large roll. For the purpose of ease of introduction of the paper the flange may be in the preferred form, bent abruptly back at its edges to provide rounded exterior shoulders. The area of the inner faces of the flanges which are spaced apart the minimum distance is then reduced to a minimum and there is thus little danger of objectionable constriction or binding of the paper in rolling or unrolling, as it is only constricted as it passes this small area to which it is introduced by a rounded or sloping funnel-shaped entrance. There is, moreover, a constant resilient action between the flanges and the paper holding them securely light-locked.

In order more fully to explain my invention, reference will now be made to the accompanying drawing in all figures of which the same reference characters designate the same parts and in which certain parts and dimensions are exaggerated for the sake of clearness.

Fig. 1 is an elevation of a spool embodying my invention, with the end of a strip of paper;

Fig. 2 is an enlarged section of one end of the spool;

Fig. 3 is a perspective view of one end of the spool;

Fig. 9 is a similar section with a loose roll of few convolutions;

Fig. 10 is a section of a portion of a modified form of spool;

Fig. 11 is a section of a portion of another modification;

Fig. 12 is a fragmentary section illustrative of the resilient action of the flange.

Figure 4:
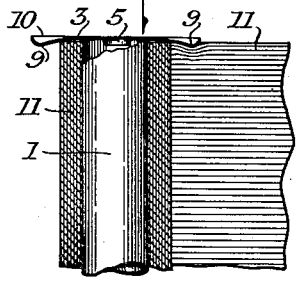
Fig. 4 is a section of one end of the spool with a strip of material partially wound thereon.

My preferred form of spool is shown in Figures 1 to 3, and has a cylindrical metal core 1, with the usual slot 2 for the insertion of the end of the backing paper. Sheet metal flange members 3 are secured at the opposite ends of the core by any suitable means, such as spot welding, which will give a light-tight rigid connection between the flanges and the core. The central portions of the flange members opposite the ends of the core are flat and in one is formed an axial aperture 5 for the reception of a supporting trunnion in the camera, and in the other a slot 6 for the reception of a winding key. From this central flat portion, the flange members are inclined gradually inwardly, such inclination being uniform and continuous around the center and proceeding to a ring 9 of maximum displacement where a reverse curvature is formed from which the edges of the flange round or incline sharply outwardly so that the peripheral edge 10 is approximately in a plane with the central flat portion.

While a certain amount of variation is permissible in the dimensions of the spool, I have found the best results with the paper and other materials in general use to be obtained with one in which the distance between the rings 9 of opposite flanges is less by .036 inch than the distance between the flanges at the core, and the distance of the ring inwardly from the peripheral edge is about .047 inch. The dimensions of the spool are preferably such as to fit the cameras now most generally in use, most of which require a spool, the flange members of which have a diameter of 1 25 inches, and the depth of the flange is generally .4375 inch. The length of the core will be adapted for the particular camera, the more important range being from 2 to 5 inches. While these exact dimensions are stated, it is to be understood that they are illustrative, the size of spool being necessarily such as to fit the camera, and the extent of the distortion of the flange such as gives best results with the particular strip material used. The necessary features are that there shall be on the inner or facing surfaces of the flanges an inwardly protruding or projecting ring at the margin of the flanges, which shall be continuous to provide a light seal, and which shall have, particularly on its inner side, a gradual inclination which preferably extends to the core. The spool alone as an article of manufacture is claimed in application, Serial No. 498,932, filed Sept. 6, 1921.

Figure 5:
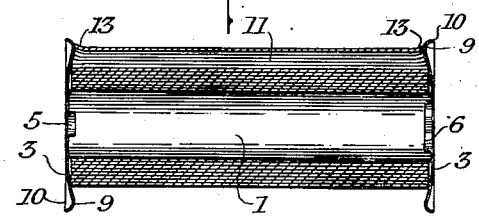
Fig. 5 is a section of a spool and strip material showing a relation they may assume during winding.
Figure 6:
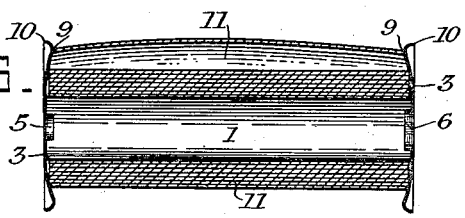
Fig. 6 is a section of a spool and strip material showing a relation they may assume during unwinding.
Figure 7:
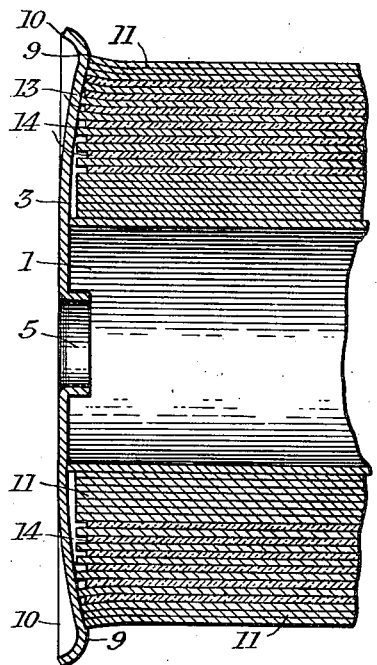
Fig. 7 is a fragmentary section showing the relation of a flange and material wound on the spool.
Figure 8:
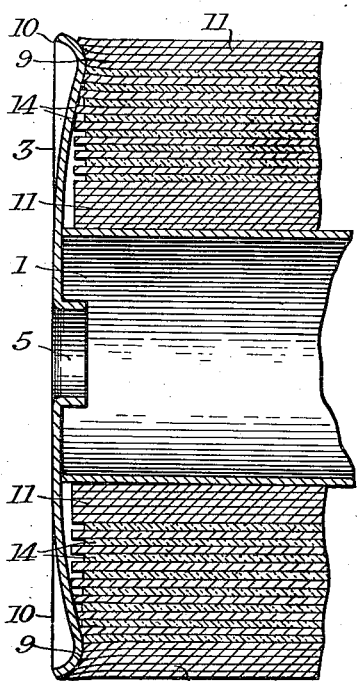
Fig. 8 is a similar section when the spool is filled by the material.

The film wound on the spool is a long strip usually attached to a backing strip at its outer end as wound before exposure in the camera. It may, however, have a leading strip attached at each end and not extending along its length, both of these types being well known. The protective paper in any event extends beyond each end of the film; and is at least as wide as the film. It is preferably cut slightly wider than the film. The width of the paper 11, is at least as wide as and preferably is slightly greater than the distance between the opposite facing rings 9 on the spool for which the paper is designed, and is not greater and is preferably less than the full length of the core 1, or the distance between the flanges at their centers. The ends of the paper are narrowed as shown at 12 to permit of ready insertion into the slot 2. In assembling the cartridge the leading end of this paper is thrust into the slot and the spool rotated, preferably on a suitable mechine, and the paper to which is attached a strip of film is wound thereon. During such winding the paper must pass between the rings 9. As the paper passes the inwardly projecting rings 9, it is momentarily constricted but tends to regain its former width. During winding, the direction of rotation of the flanges is such as to tend to cause the edges of the paper to be outwardly turned, and during unwinding the tendency would be in the opposite direction. Fig. 5 indicates the direction of the bending as it tends to be during winding and Fig. 6 indicates it as it tends to be during unwinding. If the paper is quite flexible, it may be bent at its edges as shown at 13, Fig. 5, or it may, if somewhat stiffer, bend as a whole as indicated in Fig. 6. In any event it is constricted as it passes these areas 9. As the flanges are of sheet metal, they may also tend to give or yield, usually to an imperceptible degree. If, however, the metal is quite light, this yielding may be greater. The exact action is of no great importance, the necessary feature being that there is a yielding resilient relation between the strip material and the flanges as the former passes the latter, and that both tend to regain their former shape after such pasage. The degree to which the strip material tends to regain its full width depends upon its width relative to the portion of the flange opposite which it is wound. The fact that in one form of cartridge the paper is interwound for a considerable portion of its length with the film, which is slightly narrower, permits its edge to be slightly bent without objectionable friction against the flanges, this relation being shown in Fig. 7. The edges 13 of the backing paper are here shown as bent outwardly beyond the edges of the film 14, as they would be when filling the spool. As shown here the backing paper is of such length that it entirely comes within the ring 9, and the pressure between the flange and the paper tends to hold the latter securely in place. The flange, being of sheet metal, may be sprung slightly out, particularly if the paper is the maximum width tolerated in manufacture for the particular size and the spool the minimum width tolerated, such action being indicated in Fig. 12; but there is in any event a constant resilient pressure between the flanges and paper. If the strip of film is long, the leader portion of the paper or a part thereof, will lie beyond the ring 9, and will not be held in place by the ring, a portion of a full spool being shown in Fig. 8, but the desired action between the ring and the paper will be obtained on convolutions near enough the end to protect the film fully. In all events the walls will engage the edges of outer convolutions and at once perform the double function of holding them from further expansion and forming with them a continuous light seal extending around the spool. The inclination leading to this ring is, however, so gradual that the paper and film are not held by an abrupt abutment, against which they may be torn in unrolling; but they may be drawn easily past the ring 9 because of this gradual inclination. Since the ring is limited in extent, the fact that the opposing rings are spaced apart by a distance slightly less than the width of the paper does not cause the paper to bind, since the paper is contracted only momentarily as it passes between these peaks, and there is not present a permanent contracting or frictional area of large extent holding the edges of the paper throughout its whole length when wound on the spool.

The action with a small loosely wound coil is illustrated in Fig. 9, in which the convolutions are so few that they have room to separate slightly before the outer convolutions are held by the rings 9. But even in this extreme case, the outer convolutions form a light seal with the flanges and are held against further expansion. In this case, since the material has expanded from within the edges would be bent inwardly as indicated. In this figure the film is shown as of the same width as the protective paper. It is not necessary that the outer edge of the flange member be in the plane of the central flat portion, but it may, as shown in Fig. 10, be only slightly recurved, the edge in this figure being designated 10', or the peak may be at the extreme edge of the spool as indicated at 9" in Fig. 11. In the last figure, the rolling of the paper and film upon the spool would be more difficult than in the other forms, but there would be the same advantages relating to the holding of the material from unwinding and to the unrolling of the material. The core may be made of wood instead of metal, this being shown at 1' in Figs. 10 and 11.

In Fig. 12 is indicated a film 20 without backing paper but having paper lead strips 21 at the ends only. In this figure the resilient action of the metal flange is also indicated, the dotted line 22 indicating the normal position of the flanges when the spool is empty. While as a rule, the flange will not be perceptibly sprung out, I consider within the scope of my invention a cartridge in which this is the case. In any event the movement must not be so great as to unfit the cartridge for use in cameras designed for spools with flat flanges. The extent of movement of the flange is much exaggerated and this figure is inserted merely as illustrative of the permissible resilient action of the flange which cooperates with the tendency of the paper and film to regain their full width after momentary lateral compression. Whether the flange is rigid or resilient the light lock is formed not by the flange or paper alone but by their cooperation; and this cooperation of the flange and strip material is an important element in the success of this cartridge for the desired purposes.

In all of the figures the number of convolutions is necessarily shown smaller than in practice, and the thickness of each convolution as well as the extent of the projection of the flange inwardly is magnified for the sake of clearness.

In each of the constructions, however, there are present certain necessary features of my invention. There is, in the finished cartridge a resilient binding action between the outer convolutions and the flanges, resulting in the prevention of edge fog.

From the above description it is evident that the cartridge fulfills the desired requisites as pointed out, that it can be made by manufacturing operations such as are now used for spools with flat flanges; that it fits cameras in which spools with flat flanges would fit, and that it does not affect the operations now customary or necessary in the use of a roll film camera.

Having thus described my invention what I claim as new and desire to secure by Letters Patent is:

1. As an article of manufacture, a photographic film cartridge comprising a spool having a core and end flanges and flexible strip material including light sensitive material wound thereon, the flanges having continuous, light trapping means upon their inner surfaces at the margins thereof, cooperating with outer convolutions of the strip material wound on the spool to prevent the passage of light between the edges of such wound material and the flanges.

2. As an article of manufacture, a photographic film cartridge comprising a spool having a core and end flanges and flexible strip material including light sensitive material wound thereon, the flanges having continuous light trapping means upon their inner surfaces at the margins thereof, cooperating with outer convolutions of the strip material wound on the spool to prevent the passage of light between the edges of such wound material and the flanges and also tending to prevent the unwinding of said convolutions.

3. As an article of manufacture, a photographic film cartridge comprising a spool having a core and end flanges rigid therewith and strip material including light sensitive material wound thereon, each flange having at its margin and on its inner surface inwardly projecting continuous ring, the width of the ends of the strip material being not less than the distance between the opposed rings of the two flanges, there being a yielding relation between the flanges and strip material when the latter is wound or unwound past the rings, the rings and outer convolutions of the strip material cooperating to prevent the passage of light between the flanges and the edges of the wound material, and the rings also tending to prevent the unwinding of the wound material.

4. As an article of manufacture, a photographic film cartridge comprising a core and resilient end flanges each having around its entire margin a ring projecting inwardly to a uniform extent, and a strip of material including light sensitive material wound thereon, and of a width at its outer end, greater than the distance between said rings, the flanges and strip material cooperating resiliently to form a light-tight seal preventing the passage of light between the flanges and the edges of the wound material and tending to prevent the unwinding of the wound material.

5. As an article of manufacture, a photographic film cartridge comprising a spool having a core and end flanges and strip material including light sensitive material wound thereon, each flange having upon its inwardly facing surface an inwardly protruding continuous ring at its margin, the width of part of the strip material being greater than the distance between the opposed rings of the two flanges, said rings having sloping sides whereby, when the strip material is rolled or unrolled upon said spool, it will be guided readily between said rings, there being a yielding relation between the flanges and strip material during such passage, the rings and outer convolutions of the strip material cooperating at all times to prevent the passage of light to the edges of the material wound on the spool.

6. As an article of manufacture, a photographic film cartridge comprising a spool having a core and rigidly mounted end flanges and strip material including light sensitive material wound thereon, each flange having upon its inwardly facing surface an inwardly projecting continuous ring at its margin, the inner sides of said rings inclined toward the core, the strip material having outer convolutions of width not less than the distance between such rings wound upon said spool, the inclined wall engaging said outer convolutions of the wound material and both serving to hold said material from further unwinding and also cooperating therewith to prevent the passage of light between the edges of the strip material and the flanges.

7. As an article of manufacture, a photographic film cartridge comprising a spool having a central core and similar parallel circular end flange members rigidly secured to the ends of the core, each flange member being struck from a sheet of metal, the flanges from the core toward their peripheries inclining gradually inwardly toward each other to form on each a continuous circular ring of maximum displacement near their peripheries from which rings they recurve sharply, the peripheral edges lying in the planes of the central positions of the flange members, and a strip of photographic film interwound with a strip of protective paper upon said spool, the width of the paper being greater than the distance between the opposed rings of the flanges and less than the length of the core.

8. As an article of manufacture, a photographic film cartridge comprising a spool having a central core and sheet metal end flange members rigidly attached thereto by a light-tight connection, the flange members inclining toward each other to form on each an inwardly projecting continuous ring extending around the margins thereof, and a strip of film with a strip of paper extending beyond each end thereof, wound upon the spool, the width of the paper being greater than the distance between the rings, whereby a resilient lateral compression is exerted upon the paper as it is rolled or unrolled past said rings, there being a resilient cooperative action between the flanges and the strip material wound thereon, whereby the latter is prevented from unwinding and the ends are sealed against the passage of light rays.

9. As an article of manufacture, a photographic film cartridge comprising a spool having a core and spaced flanges and strip material including light sensitive material wound thereon, at least one of said flanges having at its margin and on its inner surface an inwardly projecting continuous ring, the width of the ends of the strip material being not less than the least distance between the flanges.

10. As an article of manufacture, a photographic film cartridge comprising a spool having a core and spaced flanges and strip material including light sensitive material wound thereon, at least one of said flanges being resilient and having at its margin and on its inner surface an inwardly projecting continuous ring, the width of the ends of the strip material being not less than the least distance between the flange.

Signed at New York city, New York, this 8th day of January 1921.

EDWIN F. KINGSBURY.